United States Patent
Moreland et al.

(10) Patent No.: US 11,640,309 B2
(45) Date of Patent: *May 2, 2023

(54) TRANSFORMING INSTRUCTIONS FOR COLLABORATIVE UPDATES

(71) Applicant: Palantir Technologies Inc., Palo Alto, CA (US)

(72) Inventors: Andrew Moreland, Stanford, CA (US); John Carrino, Redwood City, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/997,193

(22) Filed: Aug. 19, 2020

(65) Prior Publication Data

US 2020/0379785 A1 Dec. 3, 2020

Related U.S. Application Data

(63) Continuation of application No. 16/133,431, filed on Sep. 17, 2018, now Pat. No. 10,782,983, which is a
(Continued)

(51) Int. Cl.
| | | |
|---|---|---|
| G06F 9/451 | (2018.01) |
| G06F 16/23 | (2019.01) |
| G06Q 10/101 | (2023.01) |
| G06F 40/169 | (2020.01) |
| G06F 40/194 | (2020.01) |
| G06F 3/0481 | (2022.01) |

(Continued)

(52) U.S. Cl.
CPC ............ *G06F 9/451* (2018.02); *G06F 3/0481* (2013.01); *G06F 3/0482* (2013.01); *G06F 16/2365* (2019.01); *G06F 40/169* (2020.01); *G06F 40/194* (2020.01); *G06Q 10/101* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 8,108,779 B1 * | 1/2012 | Rein ...................... G06F 16/40 | 715/733 |
| 8,527,660 B2 * | 9/2013 | Prasad ................ H04L 67/1095 | 709/248 |

(Continued)

OTHER PUBLICATIONS

"U.S. Appl. No. 15/298,473, Final Office Action dated Aug. 7, 2017", 21 pgs.
(Continued)

*Primary Examiner* — Christopher J Fibbi
(74) *Attorney, Agent, or Firm* — Schwegman Lundberg & Woessner, P.A.

(57) ABSTRACT

In various example embodiments, a system and method for transforming instructions for collaborative updates are described herein. A group of instructions for an update of an element depicted in a client device version of a user interface are generated. The group of instructions is executed and the group or a subset of instructions are transmitted to a server.
(Continued)

The server accepts or rejects the instructions. The server may execute the instructions to update a server version of the element. The server sends accepted instructions to the other or all client devices.

17 Claims, 10 Drawing Sheets

Related U.S. Application Data continuation of application No. 15/298,473, filed on Oct. 20, 2016, now Pat. No. 10,133,588.

(51) Int. Cl.
*G06F 3/0482* (2013.01)
*G06F 8/65* (2018.01)

(56) References Cited

U.S. PATENT DOCUMENTS

| | | | |
|---|---|---|---|
| 10,782,983 B2 | 9/2020 | Moreland et al. | |
| 2006/0200755 A1* | 9/2006 | Melmon | H04L 67/1095 |
| | | | 715/234 |
| 2015/0120252 A1* | 4/2015 | Hepworth | G06F 30/00 |
| | | | 703/1 |
| 2015/0195311 A1* | 7/2015 | Lemonik | G06F 9/44 |
| | | | 715/255 |
| 2015/0199328 A1* | 7/2015 | Danziger | G06F 40/18 |
| | | | 715/219 |
| 2019/0018693 A1 | 1/2019 | Moreland et al. | |

OTHER PUBLICATIONS

"U.S. Appl. No. 15/298,473, Non-Final Office Action dated Dec. 21, 2017", 23 pgs.

"U.S. Appl. No. 15/298,473, Notice of Allowance dated Jul. 10, 2018", 12 pgs.

"U.S. Appl. No. 16/133,431, First Action Interview—Office Action Summary dated Feb. 10, 2020", 7 pgs.

"U.S. Appl. No. 16/133,431, First Action Interview—Pre-Interview Communication dated Nov. 15, 2019", 4 pgs.

"U.S. Appl. No. 16/133,431, Notice of Allowance dated May 22, 2020", 11 pgs.

"U.S. Appl. No. 16/133,431, Response filed May 11, 2020 to First Action Interview—Office Action Summary dated Feb. 10, 2020", 10 pgs.

* cited by examiner

US 11,640,309 B2

TRANSFORMING INSTRUCTIONS FOR COLLABORATIVE UPDATES

PRIORITY APPLICATION

This application is a continuation of, and claims priority to U.S. patent application Ser. No. 16/133,431, filed Sep. 17, 2018, which is a continuation of, and claims priority to U.S. patent application Ser. No. 15/298,473, filed Oct. 20, 2016, the disclosures of which are incorporated herein in their entireties by reference.

TECHNICAL FIELD

Embodiments of the present disclosure generally relates to the technical field of special-purpose machines that facilitate interactions for transforming instructions that result in a system-wide update to a user interface including computerized variants of such special-purpose machines and improvements to such variants, and to the technologies by which such special-purpose machines become improved compared to other special-purpose machines that handle instructions for a system-wide update (e.g., back-end update). Specifically, the present disclosure addresses systems and methods to transform instructions for the system-wide update of a user interface.

BACKGROUND

Sometimes instructions for updating a user interface conflict with one another. For example, an instruction to perform an update to a user interface may conflict with a further instruction to perform a similar update to the user interface. Conventional systems and methods are often unable to resolve these conflicts. Moreover, some instructions may be delayed during transmission which causes the instructions to be received out of order. Accordingly, conventional systems are unable to handle these conflicts and delays and thus fail to perform a proper update to the user interface.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
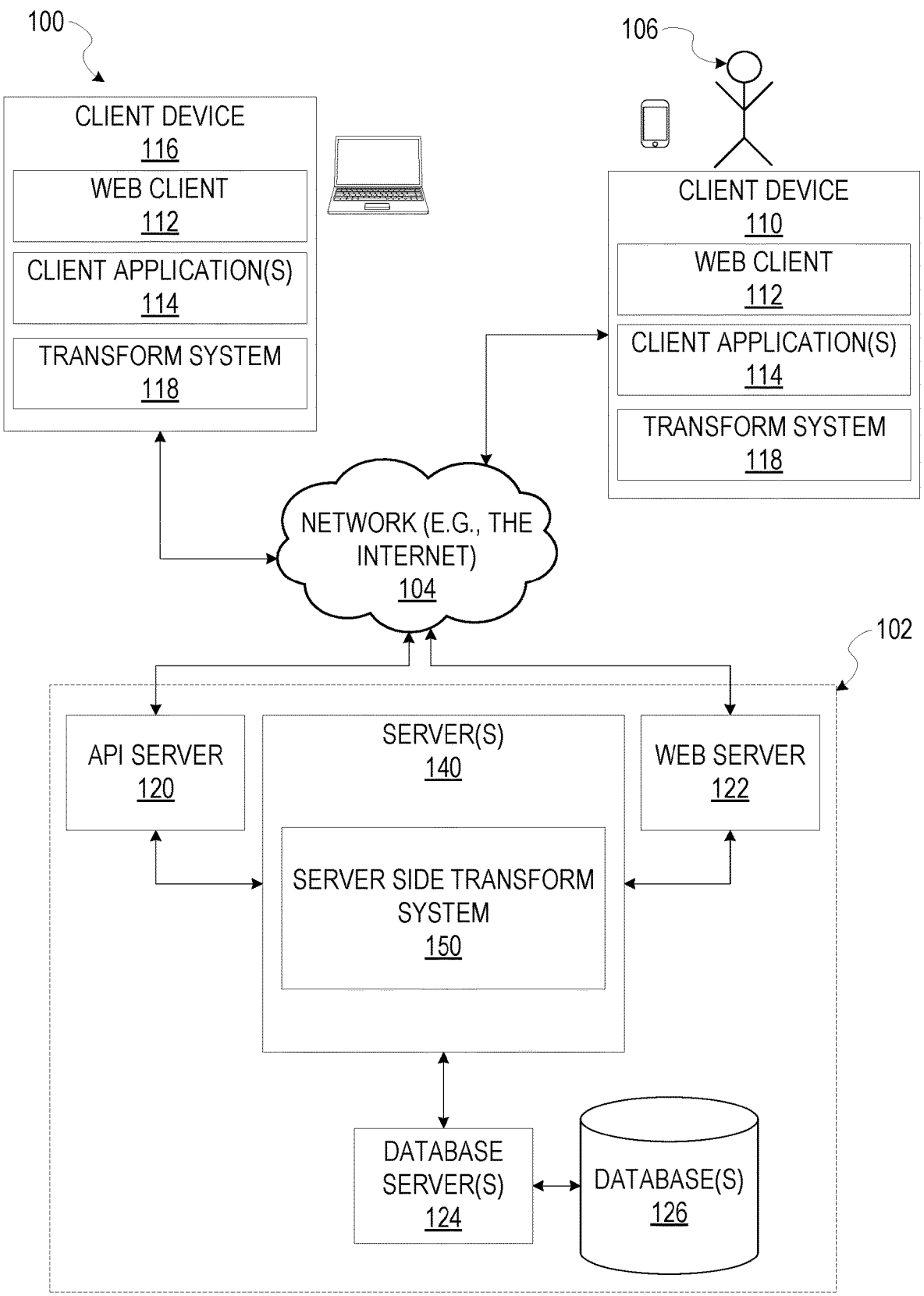
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various example embodiments of the subject matter discussed herein. It will be evident, however, to those skilled in the art, that embodiments of the subject matter may be practiced without these specific details.

In various example embodiments, a system and method to enable a plurality of devices to make collaborative edits to a user interface are described herein. The user interface is shared among the plurality of devices. In other words, each of the plurality of devices displays a respective local version of the user interface on its screen. In addition to the plurality of devices, a server maintains a database that stores and manages the collaborative edits made by the plurality of devices.

In various example embodiments, one or more elements are depicted in the user interfaces of a plurality of devices. The plurality of devices can collaborate together and make edits to the shared element(s) depicted in the devices' user interfaces. Each device optimistically executes instruction(s) that edit the element(s) depicted in the user interface. In other words, each of the plurality of devices executes one or more instructions that may edit the element(s) depicted under the assumption that there is not a conflicting edit to the element(s) by another device, and each of the plurality of devices send the instructions to a server under the assumption that the instructions will be accepted or executed by the server in its storage and management of its version of the element(s). Once received, the server in some instances may reject or accept the instructions provided from the plurality of devices.

In some instances, the server receives instruction(s) that may conflict with previously received instructions and/or its version of the shared element(s). In the event of a conflict, the server may reject the instruction(s) and may send a notification to the device about the conflict and/or that the instruction(s) were rejected or the device may not receive a confirmation that its instruction(s) were accepted or executed by the server. Accordingly, the client device may undo the instructions on its local version of the user interface.

In some instances, the server may send system-wide instruction(s) that may conflict with local instructions already executed by a client device. Accordingly, the client device may undo the local instructions, execute the system-wide instructions, transform the local instructions, re-execute the transformed local instructions, and/or send the transformed local instructions to the server. In some instances, the system-wide instructions includes instructions received from another client device in communication with the server.

In various example embodiments, the device flags front-end only instructions that do not need to be transmitted or communicated to the server. In some embodiments, the front-end only instructions may comprise one or more changes to the user interface. In some other embodiments, the front-end only instructions comprise commands for changing the display of the user interface. In some other embodiments, the front-end only instructions do not need to be executed by other devices and/or the server. In some other embodiments, the front-end only instructions may change or cause the display of a pop-up menu, context menu, or drop down menu.

In some other embodiments, the front-end only instructions are preceded by and/or followed by other local instructions that are not front-end only instructions. The other local instructions are generated by the client device as instructions for a system-wide update. In some embodiments, the other local instructions may conflict with a system-wide instruction received by the client device. For example, the system-wide instruction performs an update that precedes an update corresponding to the other local instructions generated by the client device. As such, the client device may transform the other local instructions and not transform the front-end only instructions because the front-end only instructions are not affected by the system-wide instructions, the front-end only instructions are not executed on any other device, and/or the device avoids a screen flicker, such as hiding a context menu and re-displaying the context menu.

Example methods (e.g., algorithms) facilitate displaying an update to a user interface, and example systems (e.g., special-purpose machines) are configured to facilitate displaying the update to the user interface. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

With reference to FIG. 1, an example embodiment of a high-level client-server-based network architecture 100 is shown. A networked system 102, in the example forms of a network-based transform system, provides server-side functionality via a network 104 (e.g., the Internet or wide area network (WAN)) to one or more client devices (e.g., client device 110 or client device 116).

The client device (e.g., the client device 110 or the client device 116) may comprise, but is not limited to, a mobile phone, desktop computer, portable digital assistants (PDAs), smart phones, tablets, laptops, multi-processor systems, microprocessor-based or programmable consumer electronics, or any other communication device that a user may utilize to access the networked system 102. In some embodiments, the client device includes components that are used to display information (e.g., in the form of user interfaces). In further embodiments, the client device may comprise one or more of touch screens, accelerometers, gyroscopes, cameras, microphones, global positioning system (GPS) devices, and so forth.

In one embodiment, the networked system 102 is a network-based transform system that causes display of the user interfaces on each of the client devices 110 and 116. Further, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application, or a map application that displays geographic locations and areas. FIG. 1 illustrates, for example, a web client 112 (e.g., a browser that communicates with the Internet), and a client application 114 executing on each of the client devices 110 and 116. Each of the client devices 110 and 116, for example, each displays a local version of a user interface. The user interface may display a spreadsheet, a word processing document, a map of a geographical area, and the like. In various example embodiments, the user interface depicts an element, and the element occupies a section of the user interface. Further, in some instances, each of the client devices 110 and 116 provides instructions for sending updates to server 140. As also shown in FIG. 1, each of the client devices 110 and 116 includes a transform system 118 (e.g., a transform component) that enables the client device 110 or 116 to send local instructions to the server. For example, the transform system 118 enables each of the client devices 110 and 116 to transform one or more instructions. The one or more transformed instructions may then be executed to perform an update to the local version of a user interface. Moreover, the transformed instructions may be sent to a server 140 for acceptance, storage, and/or execution.

A user 106 may be a person, a machine, or other means of interacting with the client device 110 or the client device 116. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more servers 140. The servers 140 host a server side transform system 150 which may comprise one or more modules, engines, or applications and each of which may be embodied as hardware, software, firmware, circuitry, or any combination thereof. The servers 140 are, in turn, shown to be coupled to one or more database servers 124 that facilitate access to one or more information storage repositories or database(s) 126. In an example embodiment, the databases 126 are storage devices that store information communicated (e.g., updates to a user interface) from the client devices to the server side transform system 150.

The server side transform system 150 likewise provides a number of functions to accept or reject updates and/or perform or facilitate updates to a server version or representation of the shared element(s). The server side transform system 150 may also provide a number of publication functions and services to users 106 that access the networked system 102. While the server side transform system 150 is shown in FIG. 1 to both form part of the networked system 102, it will be appreciated that, in alternative embodiments, the server side transform system 150 may form a service that is separate and distinct from the networked system 102.

In some embodiments, the server side transform system 150 determines whether a received update from a device can be accepted or stored. If the update conflicts with a previously accepted update, the server side transform system 150 may send a rejection notification and/or decline to send a confirmation of acceptance to the device that transmitted the conflicting update. In some embodiments, the server side transform system 150 maintains a local version or representation of the shared element(s), and the server side transform system 150 executes accepted instructions received from the client devices to complete an update. In some example embodiments, the server side transform system 150 stores the completed system-wide update in a database (e.g., database 126).

Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to at least FIGS. 3-5, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines (e.g., databases, devices, servers).

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines (e.g., databases, devices, servers) illustrated in FIG. 1 may be combined into a single system or machine, and the functions described herein for any single system or machine may be subdivided among multiple systems or machines (e.g., databases, devices, servers).

Figure 2:
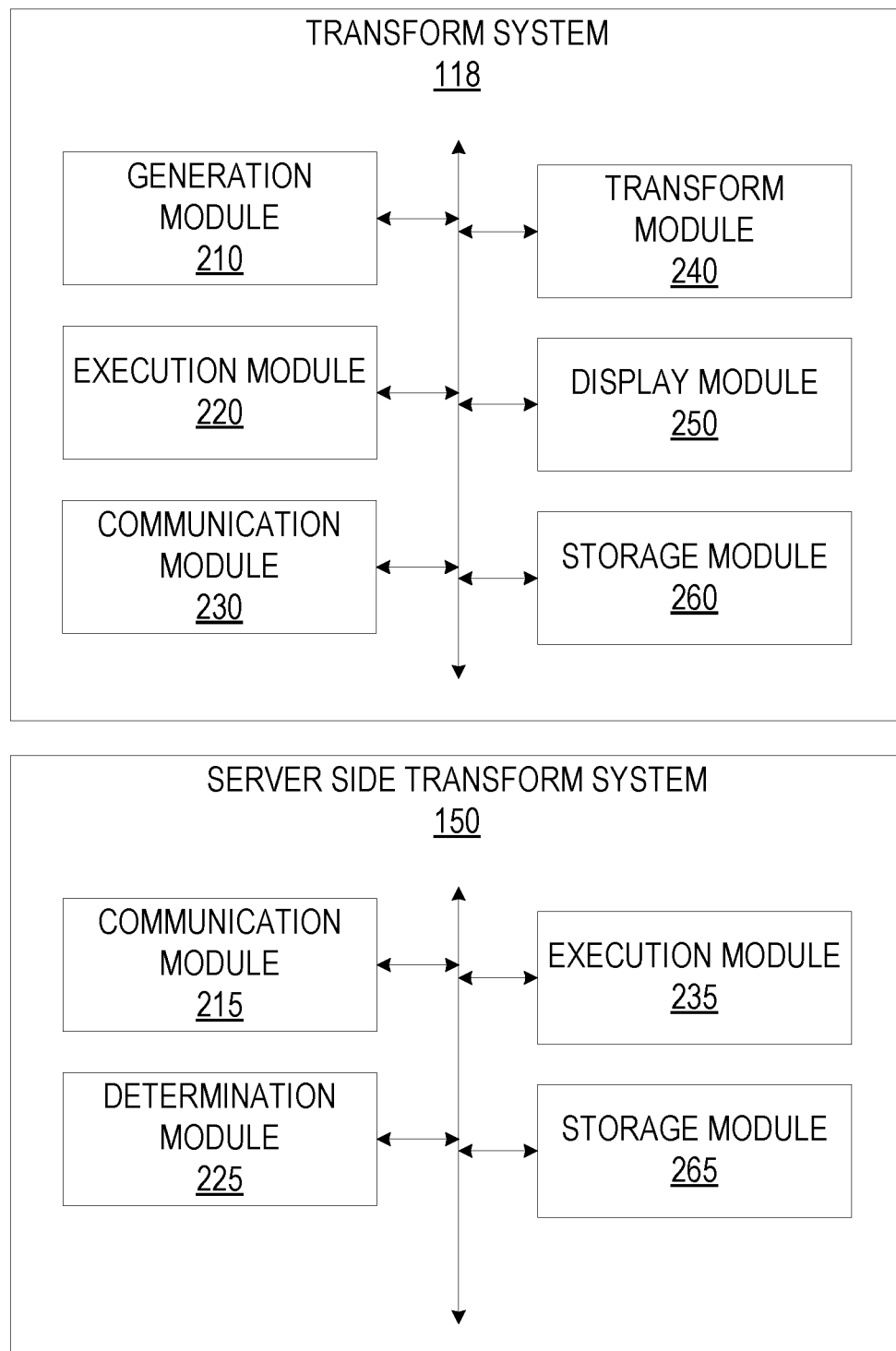
FIG. 2 is a block diagram illustrating components of a transform system, according to some example embodiments.

FIG. 2 is a block diagram illustrating components of the transform system 118 and components of the server side transform system 150, according to some example embodiments. In various example embodiments, the transform system 118 performs operations that include generating or transforming instructions for an update (e.g., front-end only update or system-wide update). The transform system 118 further performs operations to transmit the update to a server. Moreover, the modules described in FIG. 2 enable the transform system 118 to perform these operations. The transform system 118 is shown as including a generation module 210, an execution module 220, a communication module 230, a transform module 240, a display module 250, and a storage module 260 all configured to communicate with each other (e.g., via a bus, shared memory, or a switch).

The modules described in FIG. 2 enable the server side transform system 150 to accept, reject, store, and/or execute received operations from client devices. The server side transform system 150 is shown as including a communication module 215, a determination module 225, an execution module 235, and a storage module 265 all configured to communicate with each other (e.g., via a bus, shared memory, or a switch).

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

In various example embodiments, the generation module 210 is configured to generate a group of instructions that correspond to an update of an element (e.g., shared element) in a user interface. Examples of the update of the element include: annotating the element depicted in the user interface; moving the element depicted in the user interface; creating the element depicted in the user interface; deleting the element depicted in the user interface; or re-sizing the element depicted in the user interface. Other examples of the update include, but are not limited to: adding text, deleting text, changing a formatting of text, adding columns to a spreadsheet, deleting columns from a spreadsheet, resizing the columns of a spreadsheet, inputting an entry to a spreadsheet, and the like. In various example embodiments, the update is any suitable combination of any of the examples listed above.

The group of instructions may be used to perform a front-end only update of a local version of a user interface, a system-wide update of one or more client devices' user interfaces, or both. For instance, the group of instructions, when executed by an execution module 220, perform one or more front-end only updates and/or one or more system-wide updates of the element in a local version of the user interface (e.g., user interface of the client device). The front-end only update may include a dialogue box or a menu that is displayed on the client device. Moreover, the group of instructions, when executed by a server, perform one or more system-wide updates of the element.

In various example embodiments, the server version of the element(s) is stored in a database (e.g., database 126), and the server version is updated when the group of instructions are executed by the server 140.

In various example embodiments, the execution module 220 is configured to execute the group of instructions for the user interface of the client device. In further example embodiments, the group of instructions are transformed by the transform module 240, as further explained below. Accordingly, the execution module 220 is further configured to execute the transformed group of instructions. In various example embodiments, execution of the group of instructions completes an update of the user interface of the client device.

In various example embodiments, the communication module 230 is configured to receive an indication that a group of one or more instructions conflicts with a system-wide update. In various example embodiments, the communication module 230 is further configured to send or transmit the instructions to the server 140, as further explained below.

In various example embodiments, the transform module 240 is configured to transform the group of instructions. In some instances, the transform module 240 changes a parameter included in the group of instructions. For example, the transform module 240 changes a value of a parameter included in the group of instructions. Moreover, in some instances, the parameter included in the group of instructions corresponds to the property of the element being that is changed by the previous update. For example, the previous update may include moving the element to a new location in the user interface. Further to the example, the group of instructions may include edits to the element at its previous location. Therefore, the group of instructions need to be transformed in order to correct for the new location that resulted from the previous update.

As another example, the previous update may include resizing the element. Further to the example, the group of instructions may include edits to the element that do not factor in the resizing. Therefore, the group of instructions need to be transformed in order to correct for the resizing that resulted from previous update.

In various example embodiments, the display module 250 is configured to cause display of the update of the user interface on the client device. In other words, the display module 250 displays the local version of the user interface on the client device.

In various example embodiments, once the update is completed, the storage module 260 is configured to store the local version of the user interface into a database. Further, the storage module 265 is configured to retrieve the local version of the user interface from the database. The local version of the user interface includes the update of the element that was completed as a result of the execution of the group of instructions.

Referring to the server side transform system 150, in various example embodiments, the communication module 215 is configured to receive the group of instructions from the communication module 230. Moreover, the determination module 225 is configured to determine that the group of instructions conflict with a previous update or a previous group of instructions. For instance, the determination module 225 determines that the group of instructions affect a property of an element in the user interface that was changed by the previous update. Alternatively, the determination module 225 is configured to determine that the group of instructions do not conflict with the previous update. In further example embodiments, the communication module 215 receives a group of instructions transformed by the transform module 240 and the group of instructions do not conflict with the previous update.

In some embodiments, the communication module 215 provides a confirmation that server accepted the group of instructions or a notification that the server rejected the group of instructions. In some embodiments, the communication module 215 accepts the group of instructions but does not provide a confirmation to the sender of the group of instructions.

In various example embodiments, the execution module 235 is configured to execute the group of instructions received from the communication module 230. Execution of the group of instructions completes an update to the server version of the element.

In various example embodiments, the communication module 215 transmits data that causes execution and/or display of the system-wide update to the plurality of devices. The communication module 215 transmits the data through the network (e.g., network 104). As a result, the update to the element (e.g., shared element) appears in the user interface displayed by each of the plurality of devices.

In various example embodiments, the storage module 265 is configured to store the group of instructions and/or the system-wide update into a database. In some instances, the storage module 265 saves the group of instructions and/or server version of the updated element into the database. Further, the storage module 265 is configured to retrieve the group of instructions and/or server version from the database at a later time.

In some instances, the execution module 235 is configured to convert the instructions into a particular scripting language (e.g., compiling the instructions in JavaScript). In some instances, the communication module 215 sends the converted instructions to the plurality of devices. In some instances, the storage module 265 stores the converted instructions into the database.

Referring back to FIG. 1, the transform system 118 is configured to receive a request, from a user of the client device, to display a front-end only update in a user interface of the client device. In other words, the front-end only update does not get communicated to the server. In some instances, the front-end only update is a dialog box or a menu that is displayed in the user interface the requesting device (e.g., client device 110). In some instances, the front-end update is changing an appearance of an element that is displayed in the user interface of the requesting device (e.g., client device 110).

In various example embodiments, the generation module 210 is further configured to generate a third group of instructions for an update of a further element depicted in a user interface. Moreover, the further group of instructions comprise one or more front-end only instructions. The front-end only instructions are instructions that cause the front-end only update. In various example embodiments, the generation module 210 is further configured to generate a filtered group of instructions that exclude the front-end only instructions. Accordingly, in some instances, the filtered group of instructions are transmitted to the server by the communication module 230. As stated earlier, the front-end only instructions are not affected by the system-wide instructions. Also, the front-end only instructions are not executed on any other device. Therefore, these front-end only instructions are not transmitted to the server by the communication module 230.

In various example embodiments, the transform system 118 is configured to apply a flag that indicates instructions that are used by the execution module 220 to perform the front-end only update and therefore do not need to be communicated by the communication module 230 to the server. The instructions for the front-end only update are generated by the client device. Moreover, the flag is applied in order to prevent the instructions for the front-end only update from being sent to the server. In some embodiments, the transform module 240 may not execute instructions for front-end only updates to resolve conflict(s) between local updates and system-wide updates.

Figure 3:
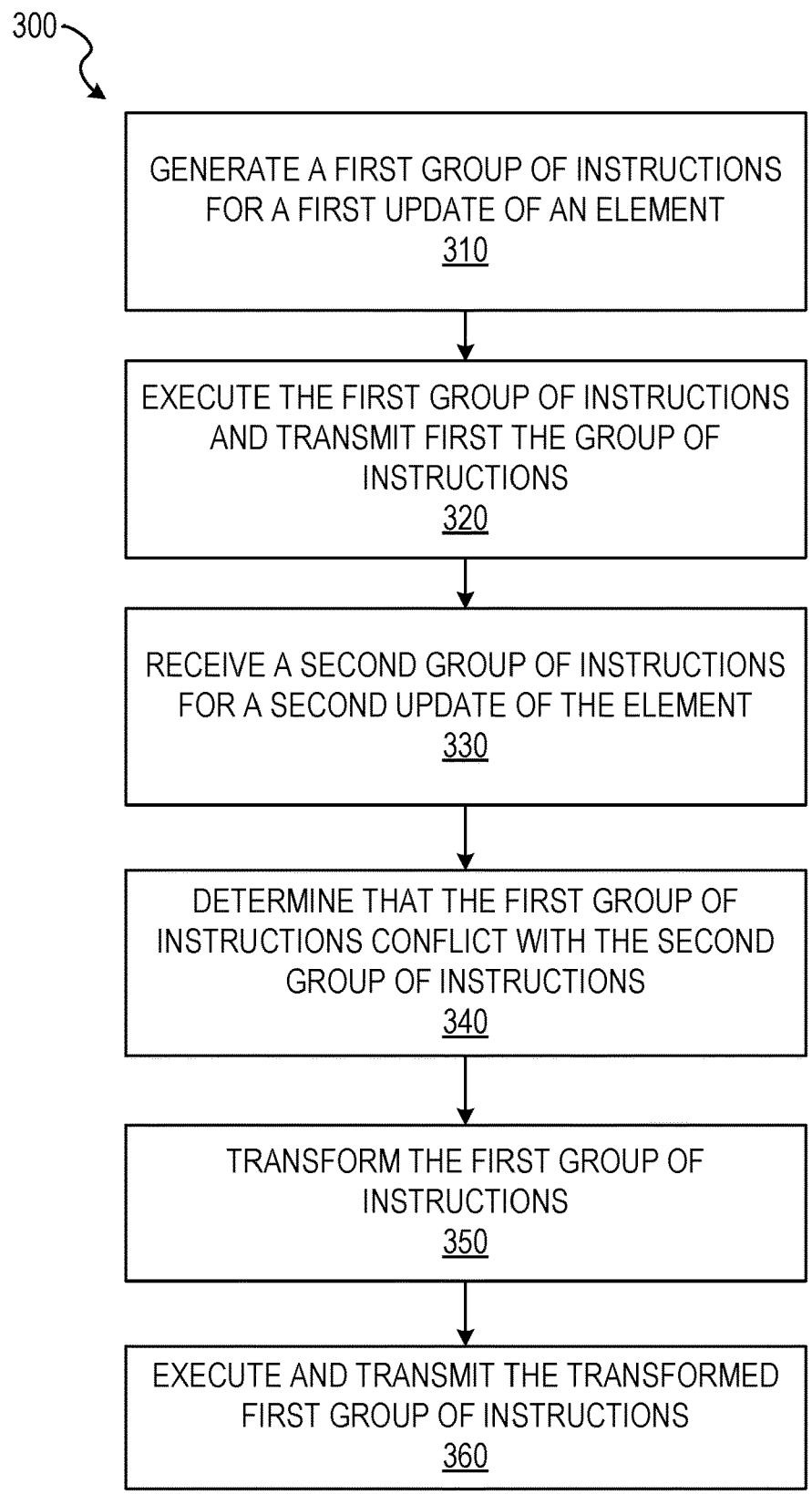
FIGS. 3-5 are flowcharts illustrating operations of the transform system in performing a method of transforming instructions for an update, according to some example embodiments.
Figure 4:
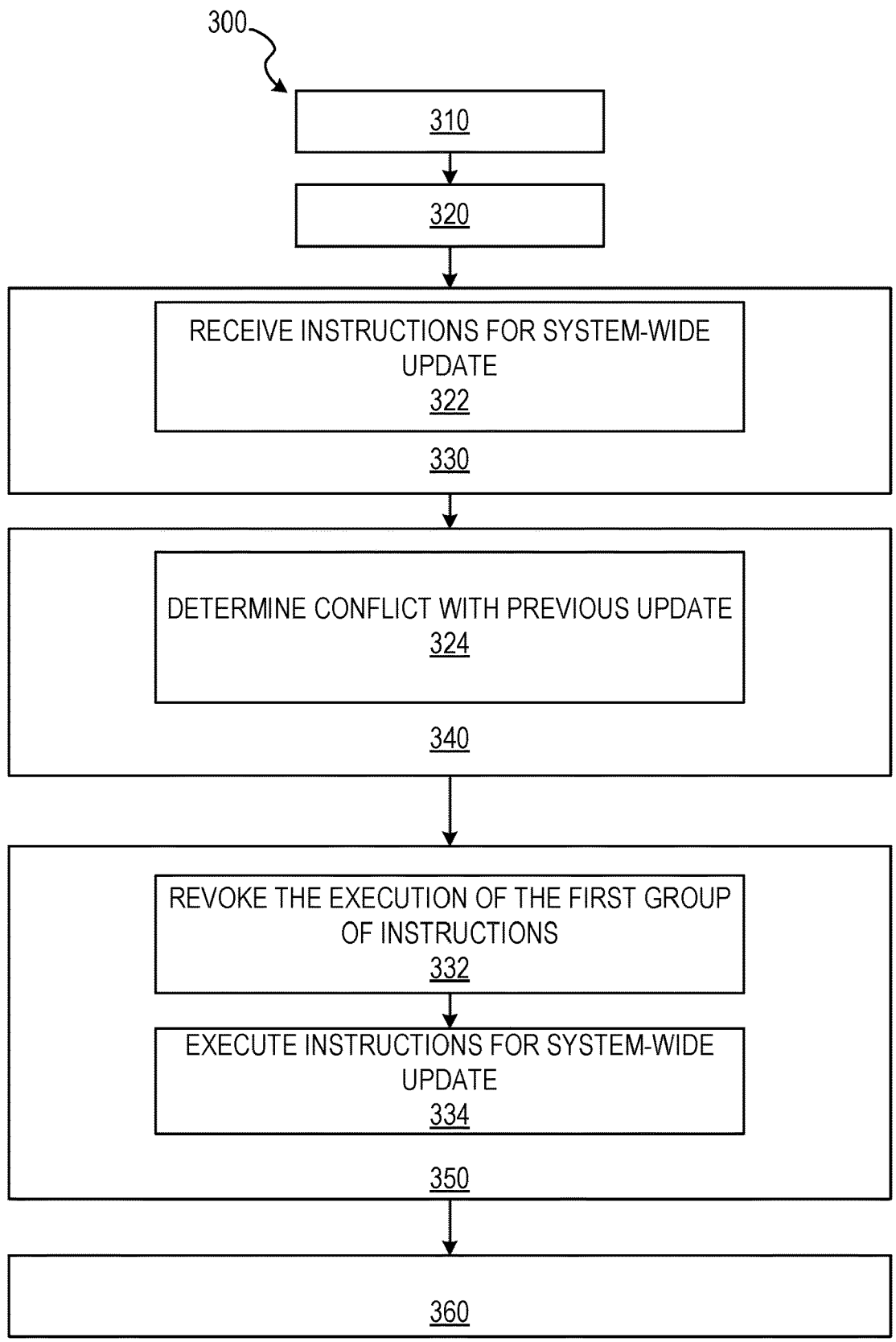
Figure 5:
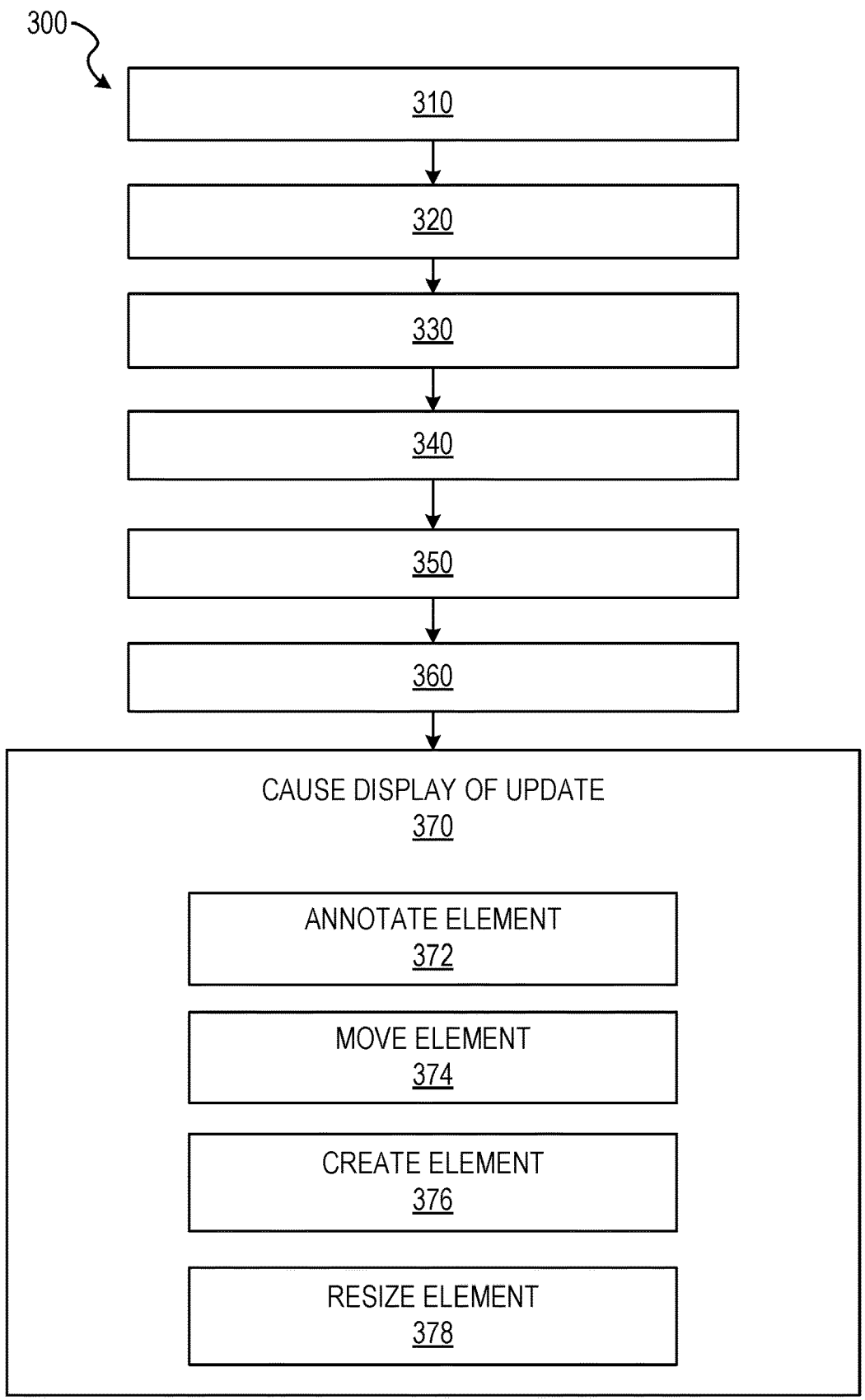

FIG. 3-5 are flowcharts illustrating operations of the transform system 118 in performing a method 300 of transforming instructions for an update, according to some example embodiments. Operations in the method 300 may be performed in part or in whole by components of transform system 118, which can be embodied either in whole or in part in one or more client devices (e.g., client device 110, client device 116) of the networked system 102 using components described above with respect to FIG. 2. Accordingly, the method 300 is described by way of example with reference to the transform system 118. However, it shall be appreciated that at least some of the operations of the method 300 may be deployed on various other hardware configurations or be performed by similar components residing elsewhere in the client-server-based network architecture 100. Therefore, the method 300 is not intended to be limited to the transform system 118. As shown in FIG. 3, the method 300 includes operations 310, 320, 330, 340, 350, and 360.

At operation 310, the generation module 210 generates a group of instructions for an update of an element depicted in a user interface. In some instances, the group of instructions, when executed by the execution module 220, perform a front-end only update of an element depicted in a user interface of the client device. In further embodiments, the group of instructions are also usable by the server 140 to perform a system-wide update to an element. In various example embodiments, the group of instructions are generated by or originate from a client device (e.g., client device 110, client device 116). As stated earlier, the server version of the element and/or group of instructions are transmitted to the one or more client devices. In other words, the one or more client devices are viewing the server version of the element and/or have executed the group of instructions sent by the server.

The element exhibits several properties. For example, the element occupies a location or a section of the user interface (e.g., element location). In other words, the element appears at the element location in the user interface. In various example embodiments, the element also displays information at the element location in the user interface. In other example embodiments, the element corresponds to a certain size. The location of the element, the information displayed by the element, and the size of the element are each examples of a property exhibited by that element.

As stated earlier, the user interface displays a spreadsheet, a word processing document, a map of a geographical area, or the like. As a result, in the case of the spreadsheet, the element is a cell from the spreadsheet that displays a value. In the case of the word processing document, for example, the element is a word or a letter that appears at a specific line in the word processing document. In the case of the geographical area, for example, the element is an object that is depicted in the geographical area. Further, the object depicted in the geographical area may correspond to real-life objects (e.g., buildings, vehicles, structures, or personnel) that are present in the geographical area. The object depicted in the geographical area may also correspond to events that take place within the geographical area.

Examples of the update of the element include: annotating the element depicted in the user interface; moving the element depicted in the user interface; creating the element depicted in the user interface; deleting the element depicted in the user interface; or re-sizing the element depicted in the user interface. In various example embodiments, the update is a suitable combination of any of the examples listed above.

In some instances, the update includes adding additional information to the information already displayed at the element location in the user interface. In some instances, the element depicted in the user interface is moved, therefore changing the element location. In some instances, a new element is generated or created in the user interface.

At operation 320, the execution module 220 executes the generated group of instructions. As a result, a local update of the element is shown in a user interface of the client device that generated the group of instructions. Moreover, at operation 320, the communication module 230 transmits the generated group of instructions to a server (e.g., server 140) in order to propagate the update of the local version of the user interface to the server and then to the other client devices.

At operation 330, the communication module 230 receives an indication and/or fails to receive a confirmation that the group of instructions conflicts with a previous system-wide update that corresponds to instructions previously accepted, stored, and/or executed by a server (e.g., server 140). In further instances, the communication module 230 receives, from the server, a second group of instructions for a second update of the element, as further explained below with in the description of FIG. 4.

At operation 340, the communication module 230 determines that a received group of instructions from the server conflict with instructions previously executed by the client device in a local update. As further explained below, the indication received may include a notification from the server 140.

In various example embodiments, the group of instructions conflicts with a previous system-wide update of an element. The conflict occurs because the generated group of instructions changes or modifies a property of the element that was also affected by the previous update. For example, the previous update may include instructions to move the element to a new location. Further to the example, the generated group of instructions may include edits to the element at its previous location. Therefore, the generated group of instructions need to be undone (e.g., reversed) or transformed in order to correct for the new location that resulted from execution of instructions corresponding to the previous update.

At operation 350, the transform module 240 transforms the generated group of instructions by changing one or more parameters included in the group of instructions. The parameter applied to the group of instructions may pertain to the property of the element that was changed by the previous system-wide update. For example, the parameter may indicate the element location, or the element size.

At operation 360, the execution module 220 executes the transformed group of instructions. As a result, a transformed update of the element is shown in a user interface of the client device that generated the group of instructions. At operation 360, the communication module 230 transmits the transformed group of instructions to the server (e.g., server 140) in order to propagate the transformed update of the user interface of the client device to the server and other client devices. The other client devices may execute and/or display the transformed update on their respective user interfaces.

In other example embodiments, transform system 118 only performs steps 310, 320, and 330. In other instances, transform system 118 further undoes (e.g., reverses, cancels, perform an inverse operation) the generated group of instructions.

As shown in FIG. 4, the method 300 may include one or more of operations 322, 324, 332, and 334.

At operation 322, the communication module 230 receives the instructions previously accepted, stored, and/or executed by the server. In some instances, the instructions previously accepted, stored, and/or executed by the server conflict with the group of instructions. As stated previously, the group of instructions are generated by and originated from a client device among the one or more devices (e.g., group of devices). In other words, the instructions previously accepted, stored, and/or executed may be a second group of instructions for a second update of the element (e.g., shared element). In various example embodiments, the instructions are received as part of a notification.

At operation 324, the communication module 230 determines that the group of instructions conflicts with a previous system-wide update. The instructions previously accepted, stored, and/or executed by the server (e.g., second group of instructions) corresponds to a previous system-wide update and thus conflicts with the group of instructions. Since the client device did not receive the second update prior to generating the group of instructions, the group of instructions may be generated based on an incorrect version of one or more elements of the user interface (e.g., a previous state of a shared element in the user interface). In this regard, execution of the second group of instructions synchronizes the client device's version of the elements so that it is consistent with the server version and/or other client devices. In various example embodiments, the previous state of the shared element is a state of the shared element prior to the previous system-wide update to the shared element.

In some instances, the previous instructions are configured (e.g., programmed) to be executed prior to the group of instructions. For instance, the second group of instructions may be generated or programmed based of a state of the element prior to an update from the first group of instructions. However, the second group of instructions are received from the server after the first group of instructions are executed.

At operation 332, the execution module 220 revokes (e.g., resizing an element by 0.5 after resizing the element by 2, moving an element by 100 pixels to the left after moving the element by 100 pixels to the right, deleting text after inserting the text, adding a column after removing a column, removing a value after adding a value, redrawing a feature of an element after it has been deleted) the execution of the group of instructions in response to the conflict. The result of the revocation effectively causes a roll back of the update of the element depicted in the user interface of the client device. As stated earlier, examples of the update of the element include: annotating the element depicted in the user interface; moving the element depicted in the user interface; creating the element depicted in the user interface; deleting the element depicted in the user interface; or re-sizing the element depicted in the user interface. In various example embodiments, the update is a suitable combination of any of the examples listed above.

At operation 334, the execution module 220 executes the instructions previously accepted, stored, and/or executed by the server (e.g., the second group of instructions) received at the operation 330. Execution of the previous instructions performs an update that takes precedence before the update corresponding to the first group of instructions generated at the operation 310. Once the instructions previously accepted, stored, and/or executed by the server are executed, the first group of instructions, as is and/or transformed, can be appropriately executed thereafter.

As shown in FIG. 5, the method 300 may include one or more of operations 370, 372, 374, 376, and 378. Further, each of the operations 372, 374, 376, and 378 may be performed as part of the operation 370.

At operation 370, the display module 250 is configured to cause display of the update to a user interface of the client device. In various example embodiments, the update includes any suitable combination of the operations 372, 374, 376, and 378.

At operation 372, the display module 250 is configured to cause display of an annotation to the element. As stated previously, the update may include annotating the element with additional information. Therefore, the display module 250 transmits data that displays the additional information being used to annotate the element at the element location in the shared interface.

At operation 374, the display module 250 is configured to cause display of a movement of the element. As stated previously, the update may include moving the element to a new location in the local version of the user interface. Alternatively, the update also may include moving the element from the user interface to a further user interface. For example, the update moves an object from a first geographical area to a second geographical area. As another example, the update moves a value from a first cell in the spreadsheet to a second cell in the spreadsheet. As a further example, the update copies and pastes text from a first line in a word processing document to a second line in the word processing document.

At operation 376, the display module 250 is configured to cause display of a creation of the element. The group of instructions in some instances causes a new element to be created in the user interface (e.g., a new object in the geographical area, a new value, or new text). Accordingly, the display module 250 is configured to cause display of the new element in the user interface.

At operation 378 the display module 250 is configured to cause display of a resizing of the element. For instance, the group of instructions may cause the object to be resized. As a result, the display module 250 causes display of the resizing in accordance with the group of instructions. Resizing the element may include changing borders of the object depicted in the geographical area. Resizing the element also includes increasing or decreasing a font size.

Figure 6:
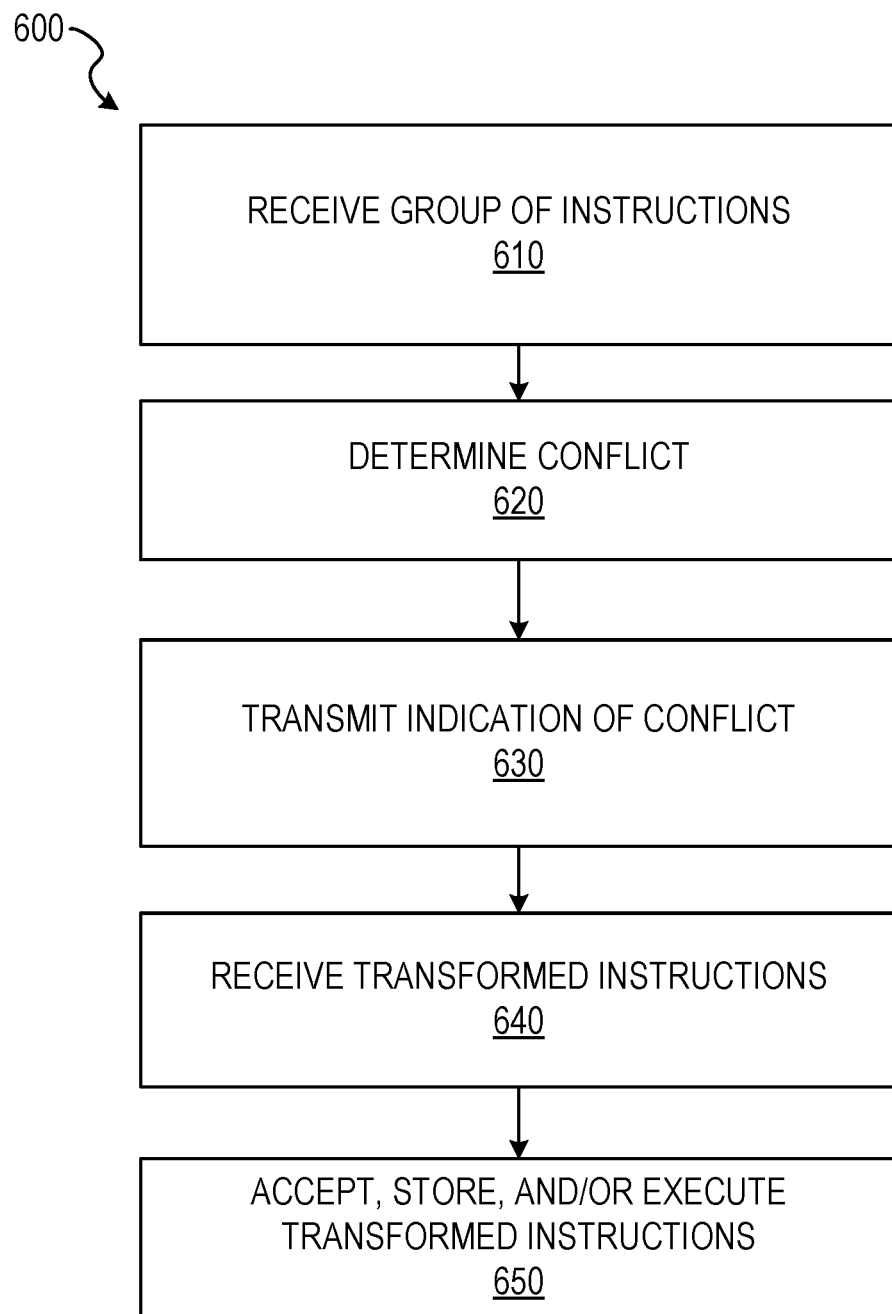
FIG. 6 is a flowchart illustrating operations of a server side transform system in performing a method of executing transformed instructions, according to some example embodiments.

FIG. 6 is a flowchart illustrating operations of a server side transform system 150 in performing a method 600 of accepting, storing and/or executing transformed instructions, according to some example embodiments. As shown in FIG. 6, the method 600 includes operations 610, 620, 630, 640, and 650.

At the operation 610, the communication module 215 receives a group of instructions from the communication module 230 of the transform system 118. As stated previously, the group of instructions are transmitted from the transform system 118 during the operation 320 of FIG. 3.

At the operation 620, the determination module 225 determines that the group of instructions conflict with a previous update. In various example embodiments, the previous update is received from another client device that communicates with the server side transform system 150.

Moreover, the previous update may affect a property of the element which is also operated on by the group of instructions. In further embodiments, the determination module 225 may determine that the group of instructions do not conflict with a previous update.

At the operation 630, the communication module 215 transmits an indication that the group of instructions conflict with the previous update. In alternative embodiments, the communication module 215 may not transmit any indication of a conflict and the client device does not receive a confirmation of acceptance by the server within a predetermined period. As stated previously, the indication may be received by the transform system 118 at the operation 330 of FIG. 3.

At the operation 640, the communication module 215 receives a transformed group of instructions from the transform system 150. As stated previously, the transformed group of instructions are transmitted from the transform system 118 during the operation 360 of FIG. 3. At the operation 650, the execution module 235 accepts, stores and/or executes the transformed group of instructions.

Figure 7:
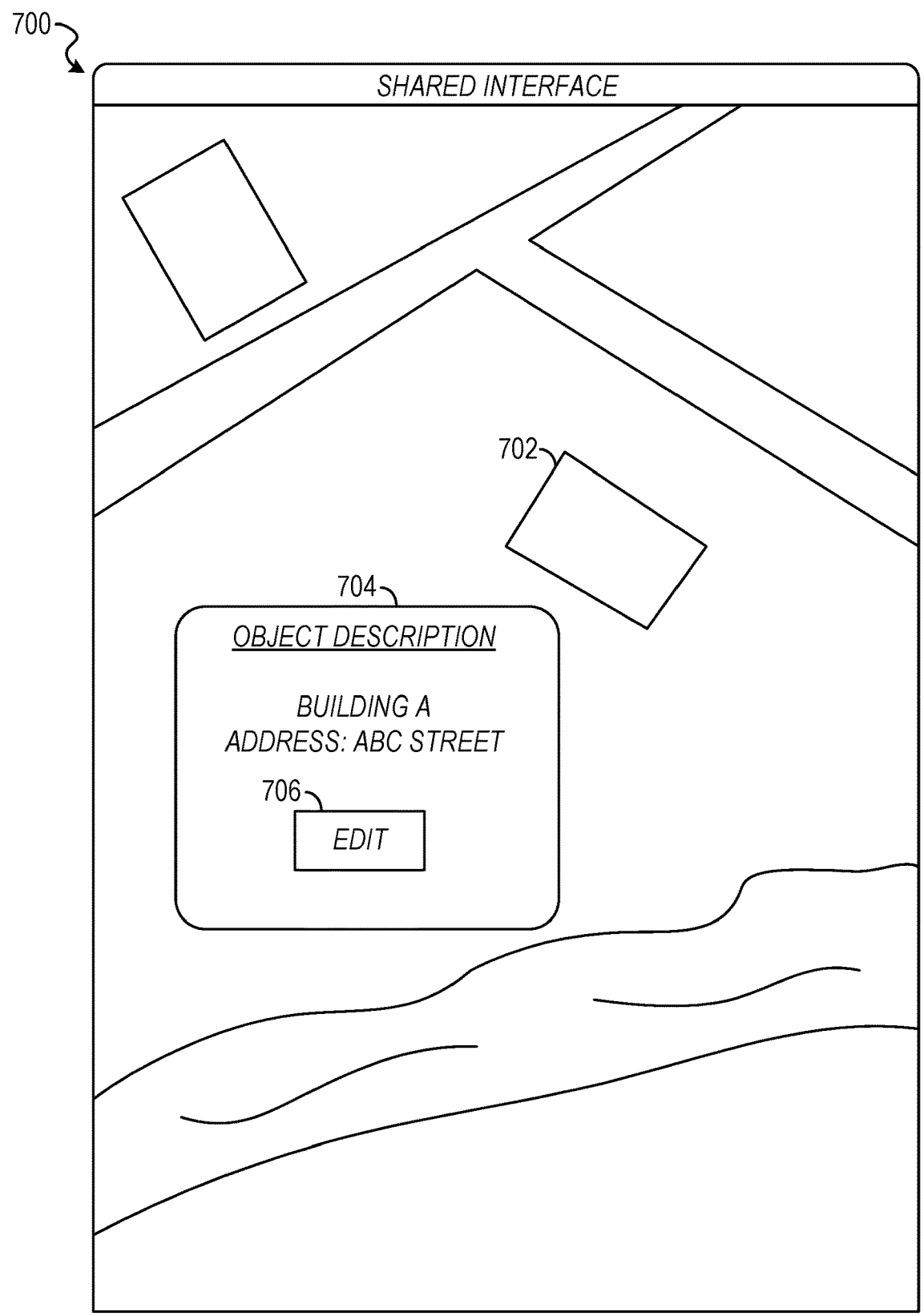
FIG. 7 is a block diagram that depicts a user interface, according to some example embodiments.

FIG. 7 is a block diagram that depicts a user interface, according to some example embodiments. The user interface 700 is displayed on each of a plurality of devices. Also included in the user interface is an object 702 and a description 704. The object 702 and the description 704 are elements that can each be updated by a device among the plurality of devices. Moreover, the description 704 includes information that is used to describe the object 702.

As shown in the user interface 700, the description 704 includes a button 706 that is selectable to edit the description. Selection of the button 706, in some instances, causes a request to be sent to the generation module 210. The request, in some instances, is a request to display a front-end only update on a client device. Although a button is shown in FIG. 7, in some instances, the description 704 itself can function as a trigger that is selectable to edit the description.

Figure 8:
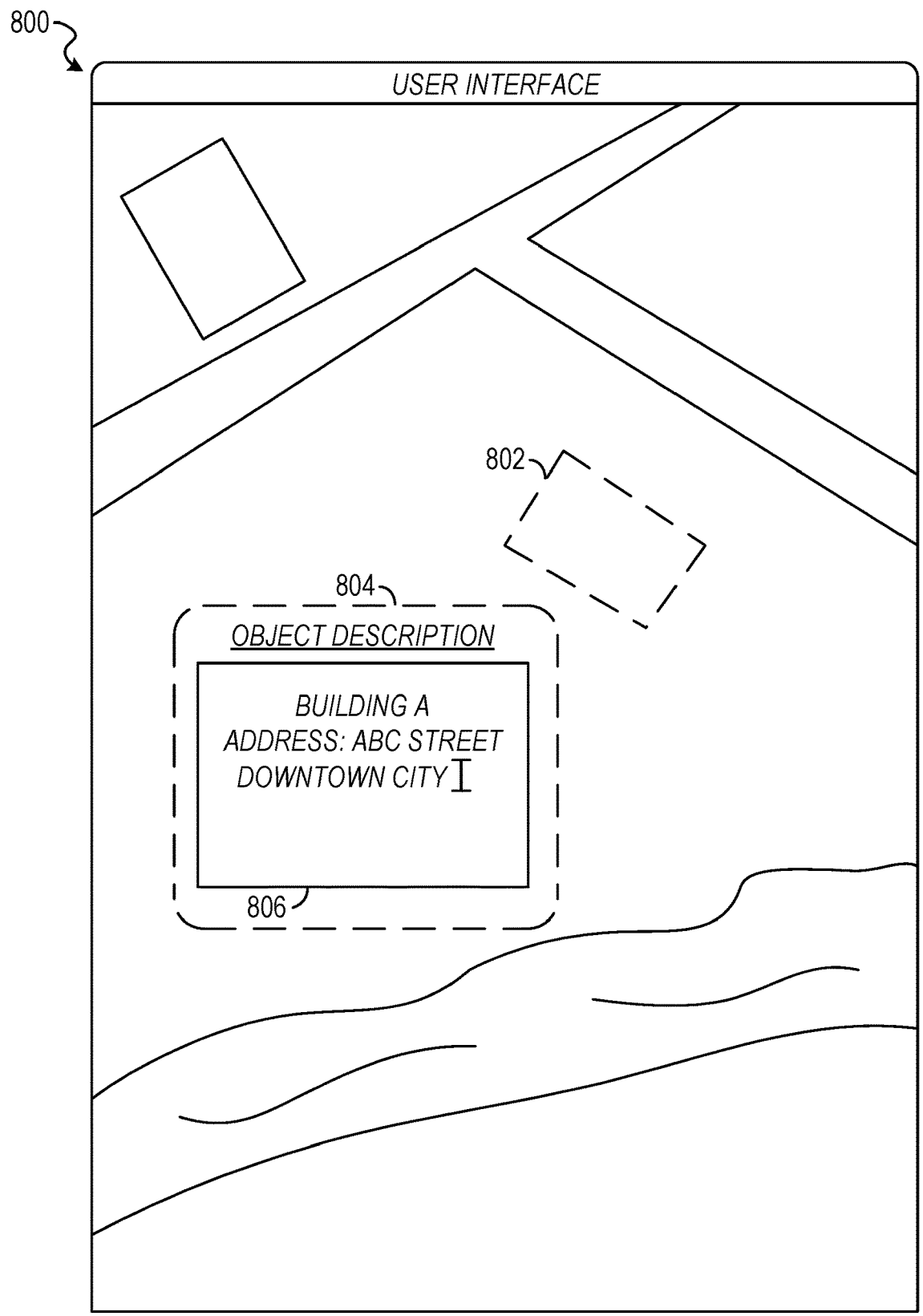
FIG. 8 is a block diagram that depicts a user interface of a client device, according to some example embodiments.

FIG. 8 is a block diagram that depicts a user interface of a client device, according to some example embodiments. The user interface 800 is displayed on a specific client device that is used to select the button 706 of FIG. 7. The user interface 800 includes an object 802, a description 804, and a dialogue box 806. The object 802 and the description 804 both appear dotted to indicate that they are currently capable of being edited by the specific client device. In some example embodiments, the dotted lines are only displayed on the specific client device that is being used to edit the object 802 and the description 804. In other words, the appearance of the dotted lines is a front-end only update to the user interface 800 of the specific client device. The dialogue box 806 is also a front-end only update to the user interface 800 where a user of the client device can enter an annotation to the description 804. In various example embodiments, elements in the user interface 800 does not match the server version of the elements.

Figure 9:
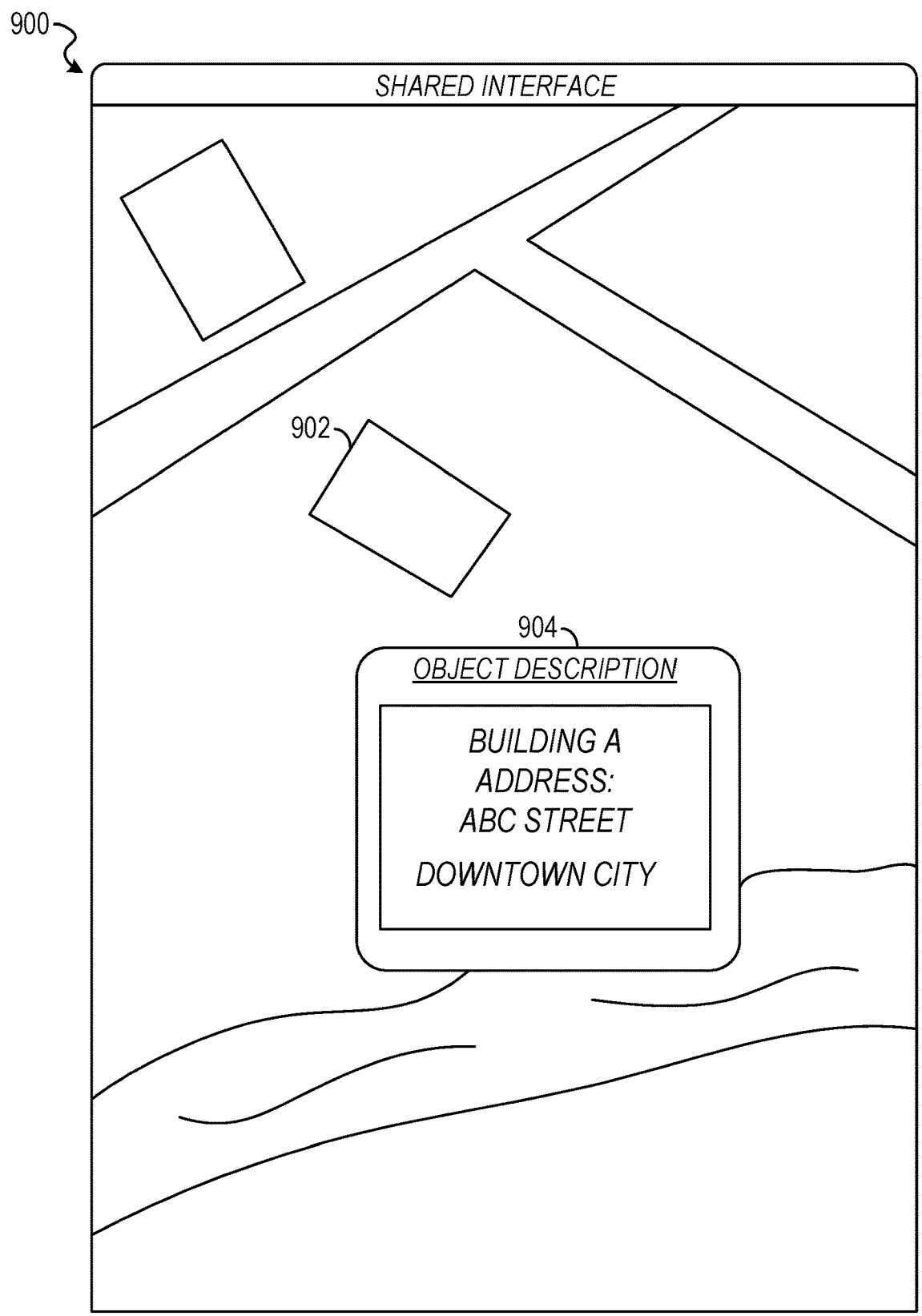
FIG. 9 is a block diagram that depicts a user interface, according to some example embodiments.

FIG. 9 is a block diagram that depicts a user interface, according to some example embodiments. The user interface 900 is displayed on each of a plurality of devices. Moreover, the user interface 900 includes an object 902 and a description 904. The user interface 900, in some example embodiments, displays one or more system-wide updates of the object 902 and of the description 904. As shown in FIG. 9, the description 904 includes the edits that were made by the user in the dialogue box 806 of FIG. 8. As also shown in FIG. 9, the system-wide updates include movement of the object 902 and the description 904 and an increase in the font size of the information in the description 904. These system-wide updates are displayed by the display module 250 in each of the plurality of devices viewing the user interface. In various example embodiments, elements in the user interface 900 do not matches the server version of the elements.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 10:
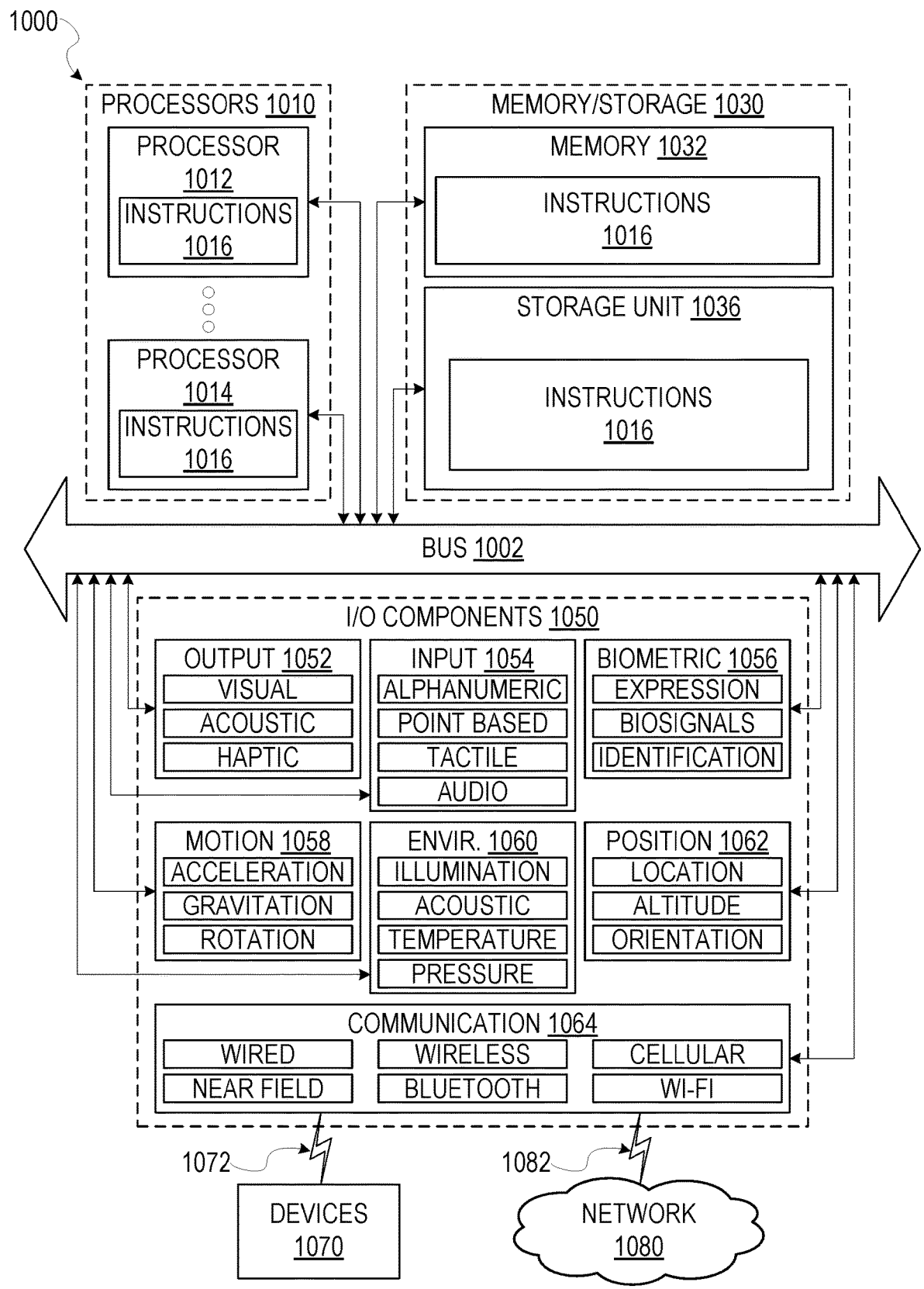
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions may cause the machine to execute the flow diagrams of FIGS. 3-5. Additionally, or alternatively, the instructions may implement the modules described in of FIG. 2. The instructions transform the general, non-programmed machine into a particular machine specially configured to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by a client device, a first group of instructions from a server, the first group of instruction instructing the client device to execute a first update to an element of a user interface presented on the client device, the first group of instructions having been received by the server from a second client device, wherein the first group of instructions are generated based off a state of the element presented on a user interface of the second client device;
   determining that the first group of instructions conflicts with an input received from a user of the client device to perform a second update to the element of the user interface;
   in response to determining that the first group of instructions conflicts with the input:
      generating a second group of instructions based on transforming the first group of instructions and the second update to the element of the user interface,
      executing the second group of instructions locally on the client device, and
      transmitting the second group of instructions to the server, wherein the server transmits the second group of instructions to the second client device and causes the second client device to execute the second group of instructions.

2. The method of claim 1, further comprising:
   receiving the input to perform a second update to the element of a user interface presented on the client device.

3. The method of claim 1, wherein the first group of instructions are generated by the second client device and transmitted to the server.

4. The method of claim 1, further comprising:
   generating a third group of instructions for an update to a second element of the user interface, the third group of instructions including at least one front-end only instruction;
   executing the third group of instructions locally on the client device, including the at least one front-end instruction;

generating a filtered group of instructions based on the third group of instructions, wherein the filtered group excludes the at least one front-end only instruction; and transmitting the filtered group of instructions to the server.

5. The method of claim 1, wherein the user interface displays at least one of:

a spreadsheet;

a geographical area; or a word processing document.

6. The method of claim 1, wherein the first update includes moving the element from a first position to a second position.

7. A client device comprising:

one or more computer processors; and one or more computer-readable mediums storing instructions that, when executed by the one or more computer processors, cause the client device to perform operations comprising:

receiving, by a client device, a first group of instructions from a server, the first group of instruction instructing the client device to execute a first update to an element of a user interface presented on the client device, the first group of instructions having been received by the server from a second client device, wherein the first group of instructions are generated based off a state of the element presented on a user interface of the second client device;

determining that the first group of instructions conflicts with an input received from a user of the client device to perform a second update to the element of the user interface;

in response to determining that the first group of instructions conflicts with the input:

generating a second group of instructions based on transforming the first group of instructions and the second update to the element of the user interface, executing the second group of instructions locally on the client device, and transmitting the second group of instructions to the server, wherein the server transmits the second group of instructions to the second client device and causes the second client device to execute the second group of instructions.

8. The client device of claim 7, the operations further comprising:

receiving the input to perform a second update to the element of a user interface presented on the client device.

9. The client device of claim 7, wherein the first group of instructions are generated by the second client device and transmitted to the server.

10. The client device of claim 7, the operations further comprising:

generating a third group of instructions for an update to a second element of the user interface, the third group of instructions including at least one front-end only instruction;

executing the third group of instructions locally on the client device, including the at least one front-end instruction;

generating a filtered group of instructions based on the third group of instructions, wherein the filtered group excludes the at least one front-end only instruction; and transmitting the filtered group of instructions to the server.

11. The client device of claim 7, wherein the user interface displays at least one of:

a spreadsheet;

a geographical area; or a word processing document.

12. The client device of claim 7, wherein the first update includes moving the element from a first position to a second position.

13. A non-transitory computer-readable medium storing instructions that, when executed by one or more computer processors of a client device, cause the client device to perform operations comprising:

receiving, by a client device, a first group of instructions from a server, the first group of instruction instructing the client device to execute a first update to an element of a user interface presented on the client device, the first group of instructions having been received by the server from a second client device, wherein the first group of instructions are generated based off a state of the element presented on a user interface of the second client device;

determining that the first group of instructions conflicts with an input received from a user of the client device to perform a second update to the element of the user interface;

in response to determining that the first group of instructions conflicts with the input:

generating a second group of instructions based on transforming the first group of instructions and the second update to the element of the user interface, executing the second group of instructions locally on the client device, and transmitting the second group of instructions to the server, wherein the server transmits the second group of instructions to the second client device and causes the second client device to execute the second group of instructions.

14. The non-transitory computer-readable medium of claim 13, the operations further comprising:

receiving the input to perform a second update to the element of a user interface presented on the client device.

15. The non-transitory computer-readable medium of claim 13, wherein the first group of instructions are generated by the second client device and transmitted to the server.

16. The non-transitory computer-readable medium of claim 13, the operations further comprising:

generating a third group of instructions for an update to a second element of the user interface, the third group of instructions including at least one front-end only instruction;

executing the third group of instructions locally on the client device, including the at least one front-end instruction;

generating a filtered group of instructions based on the third group of instructions, wherein the filtered group excludes the at least one front-end only instruction; and transmitting the filtered group of instructions to the server.

17. The non-transitory computer-readable medium of claim 13, wherein the user interface displays at least one of:

a spreadsheet;

a geographical area; or a word processing document.

* * * * *